(12) United States Patent
Tanaka et al.

(10) Patent No.: US 7,119,764 B2
(45) Date of Patent: Oct. 10, 2006

(54) COMBINATION INDICATOR ASSEMBLY IN VEHICLE INSTRUMENT PANEL

(75) Inventors: Shunji Tanaka, Kobe (JP); Keishi Fukumoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 275 days.

(21) Appl. No.: 10/634,301

(22) Filed: Aug. 5, 2003

(65) Prior Publication Data

US 2004/0046713 A1 Mar. 11, 2004

(30) Foreign Application Priority Data

Aug. 13, 2002 (JP) .............. 2002-235520

(51) Int. Cl.
*G09G 3/04* (2006.01)
(52) U.S. Cl. .......................... 345/40; 345/33
(58) Field of Classification Search ................ 345/1.1, 345/7, 8, 40, 33, 34, 39, 46; 340/815.4, 461, 340/688; 701/20, 1, 29, 30, 34; 349/68; 116/62.4, 62.3, 129, 116
See application file for complete search history.

(56) References Cited

U.S. PATENT DOCUMENTS

| 4,814,757 A | * | 3/1989 | Patterson et al. ............. 345/40 |
| 5,130,827 A | * | 7/1992 | Pavone et al. ................ 349/68 |
| 5,136,516 A | * | 8/1992 | Twombly ..................... 701/20 |
| 6,333,697 B1 | * | 12/2001 | Kumazawa et al. ..... 340/815.4 |
| 6,667,726 B1 | * | 12/2003 | Damiani et al. ............. 345/1.1 |
| 6,693,523 B1 | * | 2/2004 | Abel et al. .................. 340/461 |

OTHER PUBLICATIONS

Hoist Fitness Systems CD2900 Rear Delt/Pec Fly, Brochure Jan. 2001.

* cited by examiner

*Primary Examiner*—Nitin Patel

(57) ABSTRACT

To provide a combination indicator assembly (1) of a minimized size to provide a sporty feeling and easy to view various displayed parameters while having an increased display functionality, the combination indicator assembly (1) includes a generally arcuate analog display unit (2) for displaying the number of revolutions of a vehicle engine, and a generally rectangular digital display unit (7) disposed inside the analog display unit (2). The digital display unit (7) includes a speedometer region (8), a distance meter region (9) for displaying the distance of travel of the vehicle or a coolant temperature display region (10) for displaying the temperature of a coolant used to cool an engine of the vehicle.

16 Claims, 3 Drawing Sheets

COMBINATION INDICATOR ASSEMBLY IN VEHICLE INSTRUMENT PANEL

BACKGROUND OF THE INVENTION

1. Field of the Invention

The present invention generally relates to a vehicle instrument panel and, more particularly, to a combination indicator assembly suitably used in motor vehicles such as motorcycles.

2. Description of the Prior Art

As is well known to those skilled in the art, various instrument panels employed in automotive vehicles generally includes a tachometer, a speedometer, an odometer, a trip odometer, a fuel indicator, a temperature indicator, switching buttons and some other indicators. One conventional motorcycle instrument panel includes indicators and switching buttons arranged forwardly and rearwardly of the tachometer, respectively, with respect to the direction of run of the motorcycle. Another conventional motorcycle instrument panel includes an analog tachometer of a round configuration positioned on one of opposite sides of the instrument panel with respect to a motorcyclist and having a pointer needle for providing an analog display of the number of revolutions of the engine, and a digital speedometer of a generally rectangular configuration positioned on the other of the sides of the instrument panel for providing a digital display of the velocity of the motorcycle and having a display window defined within a marginal area of the digital speedometer for selectively displaying a cumulative distance of travel of the motorcycle or a trip distance depending on the position of a switching button. A further conventional motorcycle instrument panel includes an analog tachometer and a digital speedometer and a digital odometer both positioned within a marginal area of the analog tachometer and on respective sides of the analog tachometer.

Those conventional motorcycle instrument panels discussed above have been found involving inconveniences. Specifically, in the case of the first-discussed motorcycle instrument panel, positioning of the indicators and the switching buttons forwardly and rearwardly of the tachometer, respectively, requires the motorcycle instrument panel to have a width increased in a direction conforming to the direction of run of the motorcycle. Accordingly, the motorcycle instrument panel as a whole tends to give rise to a bulky impression, failing to provide a sporty feeling.

In the case of the second-discussed motorcycle instrument panel, since the tachometer of the round configuration and the digital indicator of the rectangular configuration are independently arranged at left-hand and right-hand portions of the instrument panel, the instrument panel as a whole tends to become bulky. Also, although the third-discussed motorcycle instrument panel can advantageously be assembled compact in size as compared with the other conventional motorcycle instrument panels, the speedometer and the odometer are positioned spaced a distance from each other and, therefore, difficulty is often encountered in viewing the respective displays simultaneously.

SUMMARY OF THE INVENTION

In view of the foregoing, the present invention has been devised to substantially eliminate the problems and inconveniences inherent in the above discussed conventional motorcycle instrument panels and is intended to provide a combination indicator assembly for a motorcycle instrument panel of a type having a compact size to provide a sporty feeling while having an increased number of indicators that are neatly arranged and easy and comfortable to view to achieve an enhanced display functionality.

In order to accomplish the foregoing object of the present invention, there is provided a combination indicator assembly which includes a generally arcuate analog display unit for displaying the number of revolutions of a vehicle engine, and a generally rectangular digital display unit disposed inside the analog display unit. The digital display unit includes a speedometer region (a speed display region), and a multifunctional meter region (a multifunctional display region) or a coolant temperature display region for displaying the temperature of a coolant used to cool an engine of the vehicle.

With the combination indicator assembly of the structure discussed above, since the digital display unit is disposed inside the analog display unit, the required display functions can be arranged within partitioned display areas of a compact shape. Also, since the size of the combination indicator assembly as measured in a direction conforming to the longitudinal sense of the motorcycle will not increase unduly, the design of the combination indicator assembly and its peripheral can be chosen compact enough to provide a sense of speed, that is, a sporty feeling. Yet, since the number of revolutions of the engine can be displayed in a large character in the arcuate analog display unit positioned outside the digital display unit, the viewability can be enhanced advantageously. On the other hand, since the velocity of the motorcycle and the distance of travel can be displayed in the digital display unit, they can be easy to view. In addition, since the coolant temperature display region can be defined in the digital display unit, the number of the display functions can be neatly arranged within the partitioned display areas.

In a preferred embodiment of the present invention, the multifunctional meter region is capable of selectively displaying one of the distance of travel of the vehicle and a clock.

Where the combination indicator assembly of the present invention incorporates the feature discussed above, it can have a function of the clock in addition to the speedometer and the distance meter and, therefore, the number of displays can be increased without the assembly being rendered to be bulky in size while the display functionality is enhanced.

In another preferred embodiment of the present invention, the combined indicator assembly may additionally include a plurality of indicators each capable of displaying an operating condition and a selector button for selecting such displays provided in the digital display unit. The indicators and selector button are disposed at positions rightwardly and leftwardly of the analog display unit, respectively.

Where the combination indicator assembly of the present invention incorporates the feature discussed previously, since the indicators and the selector button can be disposed at the respective positions rightwardly and leftwardly of the arcuate analog display unit while the number of the displays is increased with the display functionality consequently enhanced, not only can the size of the combination indicator assembly as measured in a direction conforming to the longitudinal sense of the motorcycle be advantageously reduced, but also, the sense of speed that is particularly required in sports vehicles can be enhanced.

In a further preferred embodiment of the present invention, the digital display unit is of a generally rectangular configuration extending from a center portion of a circle, that is represented by a shape of the arcuate analog display unit, to a side portion of the circle where the arcuate analog display unit is vacated. This feature can permit the space available in the instrument panel to be effectively utilized to accommodate both the analog display unit and the digital display unit.

In a still further preferred embodiment of the present invention, the analog display unit and the digital display unit form respective parts of a liquid crystal display.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENTS

A preferred embodiment of the present invention will now be described with reference to the accompanying drawings.

Figure 1:
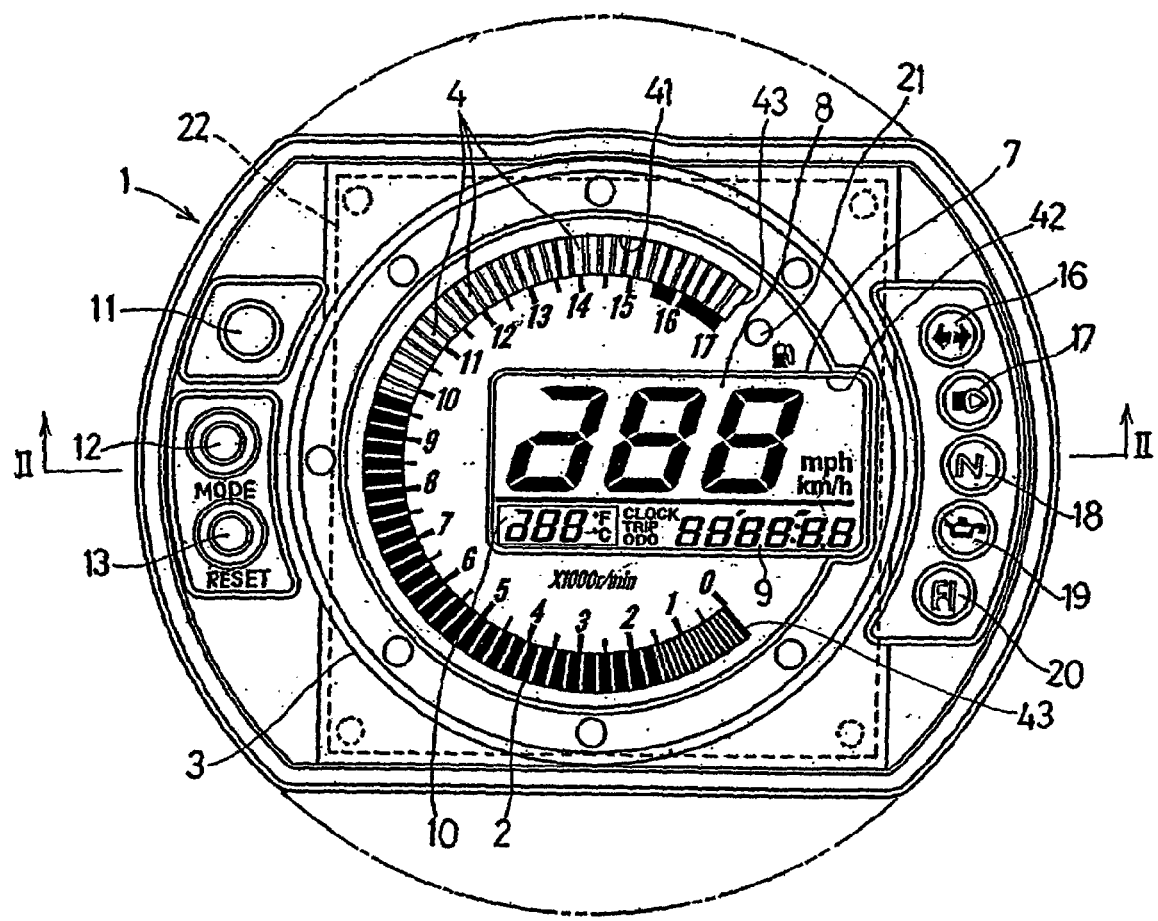
FIG. 1 is a plan view of an instrument panel including a combination indicator assembly according to a preferred embodiment of the present invention.

A combination indicator assembly according to a preferred embodiment of the present invention is shown in a plan view in FIG. 1 as applied in a motorcycle instrument panel. The combination indicator assembly 1 is adapted to be mounted on a motorcycle instrument panel that is positioned forwardly of a front fork (not shown) for the support of a front wheel of a motorcycle. This combination indicator assembly 1 includes a generally arcuate analog tachometer (an analog indicator unit) 2 positioned at a substantially center portion thereof for displaying the number of revolutions of a motorcycle engine.

Specifically, the analog tachometer 2 includes an indicator portion formed on a substantially disc-shaped tachometer indicator panel 3 so as to overlay a surface of a generally rectangular liquid crystal panel 22, as will be described in detail later, and having an arcuate cutout 41 of shape like a horse shoe extending about 270° about the center of the tachometer indicator panel 3. The arcuate cutout 41 in the tachometer indicator panel 3 allows a plurality of liquid crystal segments 4 formed on the rectangular liquid crystal panel 22 to be exposed therethrough to the outside to thereby complete the analog tachometer 2.

Specifically, a curved lip region of the analog tachometer 2 adjacent a radially inner edge of the arcuate cutout 41 is imprinted, or otherwise embossed, with equidistantly spaced serial digits reading, for example, from 0 to 17, which are indicative of the number of revolutions of the motorcycle engine per minute, when each digit is multiplied by 1000. Accordingly, when some of the liquid crystal segments 4 starting in series from the "0" position are activated (i.e., lit), the last one of the activated liquid crystal segments 4 remotest from the "0" position represents the actual number of revolutions of the motorcycle engine. Thus, the number of revolutions of the motorcycle engine is represented in the form of a curved bar graph. By way of example, when the number of revolutions of the motorcycle engine during the run of the motorcycle attains a particular value, say, 8,000 rpm, the liquid crystal segments 4 which are encompassed within a portion of the arcuate cutout 41 in the tachometer indicator panel 3 from the "0" position to the "8" position are activated.

It is to be noted that in the practice of the present invention any tachometer 2 can be employed provided that the number of revolutions of the motorcycle engine can be expressed in an analog fashion. For example, in place of the liquid crystal segments 4, a generally arcuate array of light emitting diodes may be employed. The liquid crystal segments have an advantage of cutting down on power use. Meanwhile, LEDs have an advantage of providing high-luminance.

Although not shown, the tachometer indicator panel 3 is protected from dust and dirt, from an external impact and from rain by means of a transparent protective cover in a manner well known to those skilled in the art.

The combination indicator assembly 1 also includes a single digital display unit 7 positioned inside the tachometer (the analog indicator unit) 2 or radially inwardly of the tachometer 2 and exposed to the outside through a substantially rectangular window 42 defined in the tachometer indicator panel 3. This digital indicator unit 7 is of a substantially rectangular configuration occupying a certain region of the tachometer indicator panel 3, that is, extending from a portion generally aligned with the center of the circle represented by the analog display unit 2 or the circle represented by a shape of the analog display unit 2, towards a non-cutout portion of the tachometer indicator panel 3, delimited between the opposite ends of the arcuate cutout 41 (a pair of edges 43 of the analog display unit 2), in a direction rightwards as viewed in FIG. 1. Thus, utilization of the space available in the tachometer indicator panel 3 can be maximized.

The digital indicator unit 7 includes a digital speedometer region 8 capable of providing a digital indication of the velocity of the motorcycle by driving of liquid crystal segments, a digital display region 9 defined below the digital speedometer region 8 and at a right-hand portion of the digital indicator unit 7 and a coolant temperature gauge region 10 defined below the digital speedometer region 8 and at a left-hand portion of the digital indicator unit 7.

The digital display region 9 is capable of selectively providing a visual indication of a plurality of parameters as will be described later. The coolant temperature gauge region 10 provides a digital indication of the temperature of a coolant used in the motorcycle engine by driving of liquid crystal segments.

The digital display region (multifunctional meter region) 9 functions as a digital distance meter for displaying the distance of travel of the motorcycle and a digital clock for displaying the time of the day one at a time. More specifically, the digital display region 9 functions one at a time as an odometer for providing a digital visual indication of the cumulative distance of travel of the motorcycle, a trip odometer for providing a digital visual indication of the trip distance of travel of the motorcycle subsequent to the time at which the trip odometer has been reset, and a digital clock providing a digital visual indication of the time of the day. The motorcyclist can understand which one of the time of the day, the cumulative distance and the trip distance is currently displayed in the digital display region 9, by making reference to one of lighting indicators bearing respective legends "CLOCK", "ODO" and "TRIP" which is then activated.

Two switching buttons are positioned on a left-hand portion of the arcuate tachometer 2. These switching buttons include a display mode selector button 12 and a reset button 13 juxtaposed relative to each other along a line curved to conform to the curvature of the arcuate tachometer 2. On the other hand, a plurality of, for example, five, indicator lamps 16 to 20 each providing a display of one of various operating conditions are positioned rightwardly of the tachometer indicator panel 3 and are arrayed in a line curved to conform to the curvature of the tachometer indicator panel 3.

The display mode selector button 12 is used to allow one of the clock, the trip distance and the cumulative distance to be displayed in the digital display region 9 sequentially each time the display mode selector button 12 is manually depressed. By way of example, assuming that the digital display region 9 displays the clock with the "CLOCK" legend lightened, a push of the display mode selector button 12 will allow the trip distance to be displayed in the digital display region 9 with the "TRIP" legend lightened and the subsequent push of the display mode selector button 12 will allow the cumulative distance to be displayed in the digital display region 9 with the "ODO" legend lightened. Thus, the display mode selector button 12 allows the digital display region 9 to function as the clock, the trip odometer and the odometer one at a time each time it is manually depressed. It is to be noted that a shift indicator lamp 11 is positioned above the display mode selector button 12, which lamp 11, when lit, provides the motorcyclist with a visual indication of the timing at which a gear change can be made in a motorcycle transmission as a result of the number of revolutions of the motorcycle engine attaining a predetermined value.

The five indicator lamps include a direction indicating lamp 16, a high beam indicator lamp 17 which when lit provides a visual indication of a headlight high beam being turned on, a neutral indicating lamp 18, an oil level indicator lamp 19 and an abnormality indicator lamp 20 which when lit provides a visual indication of occurrence of a trouble in a motorcycle fuel injection system. A fuel warning lamp 21 for providing a visual indication of the remaining amount of fuel within a fuel tank decreasing down to a predetermined value is positioned at a location between a terminating end of the arcuate tachometer 2 and the digital speedometer region 8.

Figure 2:
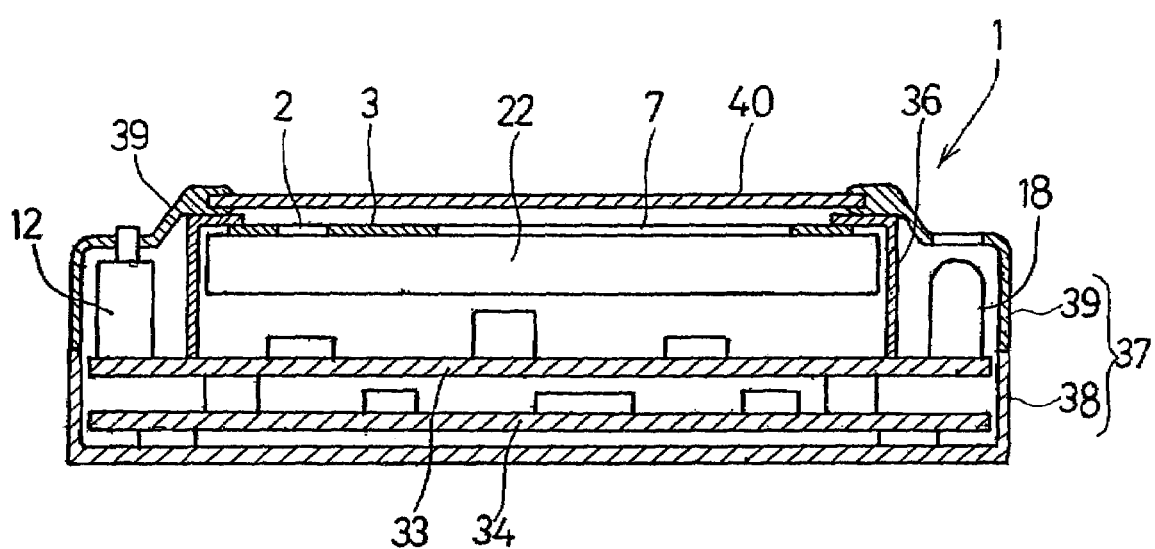
FIG. 2 is a cross sectional view of the combination indicator assembly taken along the line II—II in FIG. 1.

The respective liquid crystal segments for the tachometer 2 and the digital indicator unit 7 are incorporated in the substantially square liquid crystal display panel 22. As shown in FIG. 2, the combination indicator assembly 1 includes upper and lower printed circuit substrates 33 and 34 positioned one above the other within the combination indicator assembly 1, and the liquid crystal display panel 22 is supported by a metallic cover 36 fitted to the upper printed circuit board 33 by means of a suitable connecting means, for example, by means of a crimping or staking technique. The tachometer indicator panel 3, the liquid crystal display panel 22, the shift indicator lamp 11, the buttons 12 and 13, the indicator lamps 16 to 20, the printed circuit substrates 33 and 34 and the metallic cover 36 are all housed within an assembly casing 37 made of a synthetic resin and having a rear base 38 and a front covering 39 fitted thereto. Fixed to the front covering 39 is a lens 40 made of resin, which covers an upper surface of the liquid crystal display panel 22.

According to the state of art, the liquid crystal display panel 22 is generally fabricated in a substantially square configuration on mass production lines by splitting up a large-sized rectangular mother glass and, accordingly, in the combination indicator assembly 1 embodying the present invention, the square liquid crystal display panel 22 is utilized to construct the tachometer 2 and the digital display unit 7.

In contrast thereto, the combination indicator assembly 1 for the vehicle instrument panel is manufactured generally in a substantially round configuration in view of the appearance to thereby allow the combination indicator assembly 1 to have an added commercial value. However, if the combination indicator assembly 1 is designed to have a round configuration as shown by the double-dotted phantom line in FIG. 1, the combination indicator assembly 1 will be too bulky particularly in a direction conforming to the longitudinal sense of the motorcycle for an instrument panel of the motorcycle, failing to provide a sporty feeling.

Accordingly, as shown in FIG. 1, the circular round configuration is dissected by a pair of horizontal parallel chords to collectively form a perimeter for the casing 37.

In view of the foregoing, the combination indicator assembly 1 according to the illustrated embodiment is of a shape wherein forward and rearward portion of the disc are cut out while the arcuate tachometer 2 is encompassed within the remaining portion of the disc, leaving left-hand and right-hand portion of the disc to bulge outwardly. Thus, the shift indicator button 11, the display mode selector button 12 and the reset button 13 are all positioned in the left-hand bulged portion of the instrument panel while the five indicator lamps 16 to 20 are positioned in the right-hand bulged portion of the instrument panel. Accordingly, it will readily be understood that the combination indicator assembly 1 of the embodiment of the present invention has a minimized outer dimension as a whole and is neatly accommodated within the instrument panel while making use of the square liquid crystal panel 22.

Figure 3:
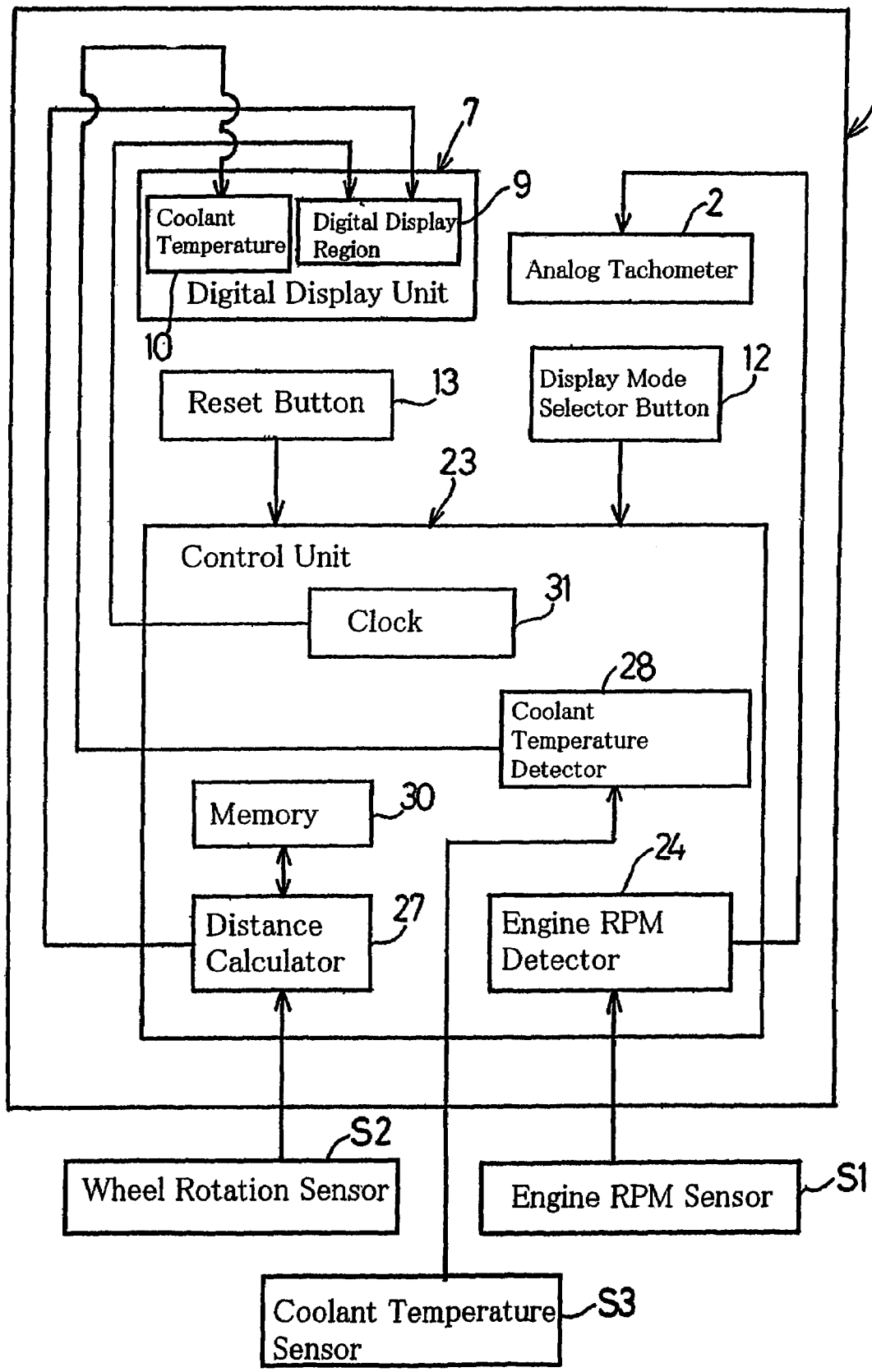
FIG. 3 is a circuit block diagram showing an electric system of the combination indicator assembly of the present invention.

Referring now to FIG. 3 showing a circuit block diagram of an electric system of the combination indicator assembly 1, the combination indicator assembly 1 includes a control unit 23 which may be a microcomputer for performing an electronic control. This control unit 23 includes an engine rpm (number of revolutions per minute) detector 24 operable in response to a detection signal, fed from an engine rpm sensor S1 for detecting the number of revolutions of the motorcycle engine, to output a display signal indicative of the number of revolutions (rpm) of the motorcycle engine so that the engine rpm can be analog displayed by the tachometer 2. The control unit 23 also includes a distance calculator 27 operable in response to a detection signal, fed from a wheel rotation sensor S2 for detecting the number of revolutions of one of the front and rear motorcycle wheels, to calculate the distance of travel of the motorcycle, and a coolant temperature detector 28 operable in response to a detection signal, fed from a coolant temperature sensor S3 for detecting the temperature of the coolant used to cool the motorcycle engine to output a coolant temperature display signal.

The distance calculator 27 is operable to update the contents stored in a memory 30 so that the cumulative distance of travel of the motorcycle then calculated thereby can be stored temporarily in the memory 30 each time a reset signal is inputted thereto as a result of a depression of the reset button 13 and also operable to start calculating the distance of travel of the motorcycle subsequent to the reset signal having been inputted thereto. This distance calculator 27 is also operable to output a trip distance display signal to the digital display region 9 in the digital indicator unit 7 when, as a result of a depression of the display mode selector button 12, the indication "TRIP" is selected, i.e., activated. The trip distance display signal so supplied to the distance display region 9 is indicative of the distance of travel of the motorcycle calculated subsequent to inputting of the reset signal. On the other hand, when the indication "ODO" is selected by the display mode selector button 12, the distance calculator 27 adds a cumulative distance indicative of the sum of the trip distance calculated subsequent to the reset to the distance read out from the memory 30 and outputs the result to the digital display region 9 in the digital indicator unit 7. Also, a clock 31 can output a time display signal to the digital display region 9 when the display mode selector button 12 is depressed.

Although not shown, the control unit 23 furthermore includes a fuel detector for detecting the quantity of fuel remaining within the fuel tank, a direction detector, a headlamp lighting detector, a neutral detector, an oil level detector and an abnormality detector for detecting the presence of an abnormality in the motorcycle fuel injection system. Those detectors are each activated in response to receipt of a corresponding detection signal fed from an associated sensor to output a display signal to the corresponding indicator lamps 16 to 20.

In the combined indicator assembly of the structure described hereinabove, the tachometer 2 comprised of the arcuate analog display unit 2 for displaying the number of revolutions of the motorcycle engine is provided in the tachometer indicator panel 3 together with the single digital display unit 7 positioned generally inwardly of the arcuate analog display unit 2, and respective spaces defined by the arcuately bulged portions of the instrument panel on left-hand and right-hand sides of the tachometer indicator panel 3 are effectively and efficiently utilized to accommodate a group of the shift indicator button 11, the display mode selector button 12 and the reset button 13 and a group of the five indicator lamps 16 to 20. This layout allows the combined indicator assembly 1 to be assembled compact in size while achieving substantial results in display functionality. Also, since the display panel has a minimized dimension in a longitudinal direction of the motorcycle while being elongated in a direction transverse to the longitudinal direction of the motorcycle, the combination indicator assembly 1 of the present invention should meet the demand from those who expect a sporty feeling from sport motorcycles.

Considering that the number of revolutions of the motorcycle engine is displayed in the form of a bar graph in an analog fashion in the arcuate tachometer 2, the motorcyclist can view the display at one glance and, thus, the viewability is high. On the other hand, the velocity and the traveling distance are displayed in the signal digital display unit 7 one at a time and, therefore, they can easily be viewed. In addition since in the combination indicator assembly 1, the distance of travel and the clock can be selectively displayed in the digital display region 9, the display functionality can be enhanced without the size of the combination indicator assembly 1 being increased.

Although the present invention has been fully described in connection with the preferred embodiment thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A combination indicator assembly for a motorcycle which comprises:
    a generally arcuate analog display unit for displaying the number of revolutions of a vehicle engine; and
    a generally rectangular digital display unit disposed the analog display unit, said display unit including a speedometer region and either a multifunctional mater region or a coolant temperature display region for displaying the temperature pf a coolant of the vehicle engine.

2. The combination indicator assembly as claimed in claim 1, wherein the digital display unit includes to multifunctional meter region and the multifunctional meter region is capable of selectively displaying one of the distance of travel of the vehicle and a clock.

3. The combination indicator assembly as claimed in claim 1, wherein to digital display unit is of generally rectangular configuration extending from a center portion of a circle, that is represented by a shape of the arcuate analog display unit, to a side portion where a gap exists between a pair of ends of the arcuate analog display unit.

4. The combination indicator assembly as claimed in claim 1, wherein the analog display unit and the digital display unit are formed on a liquid crystal panel.

5. A compact instrument display panel for a motorcycle, comprising:
    a casing assembly with a perimeter approximately defined as a pair of horizontal parallel chords dissecting a circle;
    an electrically motivated display unit mounted within the casing assembly;
    an overlay member extending across the display unit ad having a series of arcuate openings extending round a portion of a rectangular openings;
    a control unit for driving the display unit to illuminate the series of arcuate openings to provide an indicator of engine revolutions per unit of time and to provide numerical. symbols in the rectangular opening representative of performance characteristics of the motorcycle including velocity; and
    a set of indicator lamps aligned in a curvilinear pattern adjacent a circular portion of the perimeter.

6. The compact instrument display panel of claim 5 further including a plurality of operator control members aligned in a curvilinear pattern adjacent another circular portion of the perimeter opposite from the set of indicator lamps.

7. A combination indicator assembly for a motorcycle which comprises:
    a casing;
    a generally arcuate analog display unit, in the casing, for displaying to number of revolutions of a vehicle engine;
    a generally rectangular digital display unit disposed inside the analog display unit, said digital display unit including a speedometer region and a display region for displaying information on the operation of the motorcycle;
    a set of indicator lamps aligned in a curvilinear pattern adjacent a portion of a perimeter of the casing;
    a plurality of indicators each capable of displaying an operating mode; and
    a selector button for selecting the displays provided in the digital display unit, said indicators and selector button being disposed at respective positions leftwardly and rightwardly of the analog display unit, respectively.

8. The combination indicator assembly of claim 7 further including a plurality of operator control members aligned in a curvilinear pattern adjacent another portion of the perimeter opposite from the set of indicator lamps.

9. The combination indicator assembly of claim 7 wherein the casing perimeter is approximately defined as a pair of horizontal parallel chords dissecting a circle.

10. The combination indicator assembly as claimed in claim 7, wherein the digital display unit Includes a multi-functional meter region and the multifunctional meter region is capable of selectively displaying one of the distance of travel of the vehicle and a clock.

11. The combination indicator assembly an claimed in claim 7, wherein the digital display unit is of a generally rectangular configuration extending from a center potion of a circle, that is represented by a shape of the arcuate analog display unit, to a side portion between a of ends of the arcuate analog display unit.

12. The combination indicator assembly as claimed in claim 11 further including a plurality of operator control members aligned in a curvilinear pattern adjacent another portion of the perimeter opposite from the set of indicator lamps.

13. The combination indicator assembly of claim 12 wherein the casing perimeter is approximately defined as a pair of horizontal parallel chords dissecting a circle.

14. The combination indicator assembly as claimed in claim 13, wherein the digital display unit includes a multi-function meter region and the multifunctional meter region is capable of selectively displaying one of the distance of travel of the vehicle and a clock.

15. The combination indicator assembly as claimed in claim 14, wherein the analog display unit and the digital display unit are formed on a liquid crystal panel.

16. The combination indicator assembly as claimed in claim 7, wherein the analog display unit and ti digital display unit are formed on a liquid crystal panel.

\* \* \* \* \*

UNITED STATES PATENT AND TRADEMARK OFFICE
CERTIFICATE OF CORRECTION

PATENT NO. : 7,119,764 B2
APPLICATION NO. : 10/634301
DATED : October 10, 2006
INVENTOR(S) : Tanaka et al.

It is certified that error appears in the above-identified patent and that said Letters Patent is hereby corrected as shown below:

In the Claims:
Claim 1, Column 8, line 9, after "disposed" insert --inside--.
Claim 1, Column 8, line 11, "mater" should be --meter--.
Claim 1, Column 8, line 13, "pf" should be --of--.
Claim 2, Column 8, line 15, "to" should be --the--.
Claim 3, Column 8, line 20, after "of" insert --a--.
Claim 5, Column 8, line 33, "motivated" should be --activated--.
Claim 5, Column 8, line 35, "ad" should be --and--.
Claim 5, Column 8, line 36, "round" should be --around--.
Claim 5, Column 8, line 37, "openings" should be --opening--.
Claim 5, Column 8, line 41, the period "." after "numerical" should be deleted.
Claim 7, Column 8, line 55, "to" should be --the--.
Claim 9, Column 9, line 11, "Includes" should be --includes--.
Claim 11, Column 9, line 15, "an" should be --as--.
Claim 11, Column 9, line 17, "potion" should be --portion--.
Claim 11, Column 9, line 19, after "between a" insert --pair--.
Claim 14, Column 10, lines 10-11, "multifunction" should be --multifunctional--.
Claim 15, Column 10, line 18, "ti" should be --the--.

Signed and Sealed this

First Day of May, 2007

JON W. DUDAS
*Director of the United States Patent and Trademark Office*